United States Patent [19]
Kuna et al.
[11] 3,969,100
[45] July 13, 1976

[54] METHOD OF PELLETIZING GLASS BATCH MATERIALS

[75] Inventors: Kenneth J. Kuna, Plymouth; James P. Sowman, Farmington, both of Mich.

[73] Assignee: Ford Motor Company, Dearborn, Mich.

[22] Filed: Feb. 27, 1975

[21] Appl. No.: 553,859

[52] U.S. Cl. .......... 65/27; 106/52; 106/DIG. 8; 264/117
[51] Int. Cl.$^2$ .......... C09C 1/56
[58] Field of Search .......... 65/27; 106/DIG. 8, 52; 264/117

[56] References Cited

UNITED STATES PATENTS

| | | | |
|---|---|---|---|
| 3,542,534 | 11/1970 | Yamamoto | 65/27 |
| 3,555,133 | 1/1971 | Gentaz | 264/117 X |
| 3,760,051 | 9/1973 | Eirich et al. | 65/27 |
| 3,894,882 | 7/1975 | Takewell et al. | 264/117 X |
| 3,914,364 | 10/1975 | Engelleither | 264/117 |

FOREIGN PATENTS OR APPLICATIONS

| | | | |
|---|---|---|---|
| 1,814,624 | 7/1969 | Germany | 65/27 |
| 1,952,274 | 6/1970 | Germany | 65/27 |

*Primary Examiner*—S. Leon Bashore
*Assistant Examiner*—Frank W. Miga
*Attorney, Agent, or Firm*—William E. Johnson; Keith L. Zerschling

[57] ABSTRACT

A method of pelletizing glass batch materials including commercially available sand, soda ash, salt cake, other minor glass forming materials, dolomite having an average (statistical mean) particle size less than 15 microns, and limestone having an average (statistical mean) particle size less than 250 microns is disclosed. The process involves the steps of mixing the glass batch materials together. A pelletizing regime is established on a rotating, pelletizing disc in which three zones of pelletization exist in the form of a pellet nucleation zone, a pellet growth zone, and a pellet tumbling zone. Each of the zones exists generally from the top of the pelletizing disc downwardly in a curved fashion over an area of the pelletizing disc with each zone having a discernable width. A prescribed amount of water is added to a portion of a pellet growth zone established on the pelletizing disc. A prescribed amount of a caustic soda solution is also added to a portion of the pellet growth zone spaced downwardly from the top of the pellet growth zone. The caustic addition is in the form of a wide stream generally centered with respect to the centerline of the pellet growth zone and spread across a substantial portion of the width of the pellet growth zone. A prescribed amount of the mixed glass batch materials are added to a portion of the pellet growth zone spaced downwardly from the caustic addition position. The batch materials addition stream is in the form of a wide stream generally centered with respect to the centerline of the pellet growth zone. The stream of batch materials is spread across a substantial portion of the width of the pellet growth zone. The caustic addition stream has a width in the range from slightly less than the width of the batch materials addition stream to a width of about 70% of the batch materials addition stream. Both the addition streams are centered with repsect to one another.

5 Claims, 4 Drawing Figures

66
28
A
68
$H_2O$
NaOH
DRY MATL.
60
STREAM III
STREAM II
STREAM I
64
62

10
11
12
13
14
16
18
20
22
24
26
28
30
32
34
36
38
40
42
44
46
48
50
52
54

METHOD OF PELLETIZING GLASS BATCH MATERIALS

BACKGROUND OF THE INVENTION

Investigations have shown that the maximum amount of glass which may be drawn from a glass-producing furnace can be increased if the batch materials melted to form the glass (including caustic soda, soda ash, sand, limestone, salt cake and other minor ingredients such as carbon and rouge) are added to the furnace in a granulated or pelletized form instead of the conventional loose batch form. Basically, pelletizing is a process in which finely divided materials are placed on a pelletizing device such as a rotating, inclined disc and sprayed with a liquid for the purpose of forming pellets. The raw materials to be pelletized in the pelletizing device are carried under a liquid spray. Seed pellets are formed when droplets of the sprayed liquid draw a few raw material particles together. In some cases, the process is aided by a compacting action of scrapers acting against the sides and the bottom of the pelletizing device. Seed pellets are carried under the raw material feed stream and are coated with new feed materials. The alternate wetting and coating of the individual pellets plus the rolling and tumbling action imparted to the pellets by the pelletizing device cause the pellets to grow in size. The size to which the pellets grow is controlled by controlling the variables of the pelletizing process.

The ability to form pellets of proper size with an adequate green strength (strength when pellets are wet) does not necessarily mean that when the pellets are dry they will have adequate strength to resist both the crushing and the abrading forces encounted during the handling associated with glass manufacturing operations. It is necessary to thoroughly dry the glass batch pellets prior to placing them in a melting furnace as even a little residual moisture can cause the pellets to explode in the furnace. The dry pellets must be strong enough with withstand the drops, tumbling and storage conditions encountered in a pellet handling and storage system in which the pellets are moved from a pellet dryer to storage and then to a melting furnace.

The prior art teaches that the soda ash of the glass batch materials may be replaced, in whole or in part, by caustic soda. The caustic soda provides the sodium oxide for the final glass which had been previously provided for by the soda ash. This prior art is best illustrated by U.S. Pats. 3,542,534 and 3,726,697 and Canadian Patent 923,209. These patents show the mixing of glass batch materials and the use of caustic soda as a replacement for soda ash. In this prior art, the glass batch materials and the caustic soda are mixed together prior to introduction of the mixture to a pelletizing device. The patents also indicate that it is necessary to reduce the particle size of all the materials involved in the process in order to successfully pelletize.

Our co-pending patent application entitled "A Process for Producing Pre-Treated Glass Batch Materials and the Glass Product Produced Thereby", filed Feb. 27, 1975, and assigned Ser. No. 553,858, describes a process for producing high strength glass batch pellets in which caustic soda is used as a replacement for some or all of the soda ash that would otherwise be used in the glass batch. That application is hereby incorporated by reference. The application teaches that if the average particle size for the dolomite and the limestone used in the glass batch materials is controlled within specific limits, the rest of the materials used in forming the glass batch pellets may be standard, well-known glass making materials. In particular, that application teaches that if the dolomite used has an average (statistical mean) particle size less than 15 microns, preferably less than 7 microns, and the limestone has an average (statistical mean) particle size less than 250 microns, a strong pellet may be produced which resists the crushing and the abrading forces encountered in normal handling operations.

It is an object of this invention to provide a method of manufacturing strong pellets of glass batch materials on a pelletizing disc. It is a further object of this invention to provide a method of making pelletized, glass batch materials in a process using a rotating pelletizing disc in which 70 to 85% of the glass forming materials used are the commercially available materials heretofore employed in the manufacture of glass.

SUMMARY OF THE INVENTION

This invention is directed to a method for producing glass batch materials in pelletized form and, more particularly, a method of producing pelletized glass batch materials in which the dolomite and the limestone employed are sized to a particular size range while the other materials are not.

In accordance with the teachings of this invention, glass batch materials including commercially available sand, soda ash (sodium carbonate), salt cake (sodium sulfate), other minor glass forming materials, dolomite having an average (statistical mean) particle size less than 15 microns, preferably less than 7 microns, and limestone having an average (statistical mean) particle size less than 250 microns are mixed together. A pelletizing regime is established on a rotating pelletizing disc in which three zones of pelletization exists. The three zones of pelletization include a pellet nucleation zone, a pellet growth zone, and a pellet tumbling zone. Each of the zones exist generally from the top of the pelletizing disc downwardly over an area of the pelletizing disc with each zone having a discernable width. A prescribed amount of water is added to a portion of the pellet growth zone. A prescribed amount of a caustic soda solution is added to a portion of the pellet growth zone spaced downwardly from the top of the zone. The caustic addition is in the form of a wide stream generally centered with respect to the centerline of the pellet growth zone. The caustic addition stream is spread across a substantial portion of the width of the pellet growth zone. A prescribed amount of the glass batch materials are added to a portion of the pellet growth zone preferably spaced downwardly from the caustic addition position. The mixed batch materials are added in the form of a wide stream generally centered with respect to the centerline of the pellet growth zone and spread across a substantial portion of the width of the pellet growth zone. The caustic addition stream has a width in the range from slightly less than the width of the glass batch materials addition stream to a width of about 70% of the batch materials addition stream. Both addition streams are centered with respect to each other.

Further details of the method of the invention include the location of the glass batch materials addition stream generally over the widest portion of the pellet growth zone. Also, water added to the pellet growth zone may be added in a stream generally centered with respect to the centerline of the pellet growth zone and spaced above the caustic addition stream. Generally, the water stream has a width equal to the width of the caustic addition stream. Also, the pellet growth zone and the pellet nucleation zone may be either separate zones or a combined, single zone.

The method of this invention produces stable operating conditions on the pelletizing disc in which pellets of a uniform size are continuously delivered from the disc over a prolonged period of time. Variations in the size of the pellets as a function of time are generally eliminated and the operation of the disc is a substantially stable process.

DESCRIPTION OF THE PREFERRED EMBODIMENT

General Discussion

Figure 1:
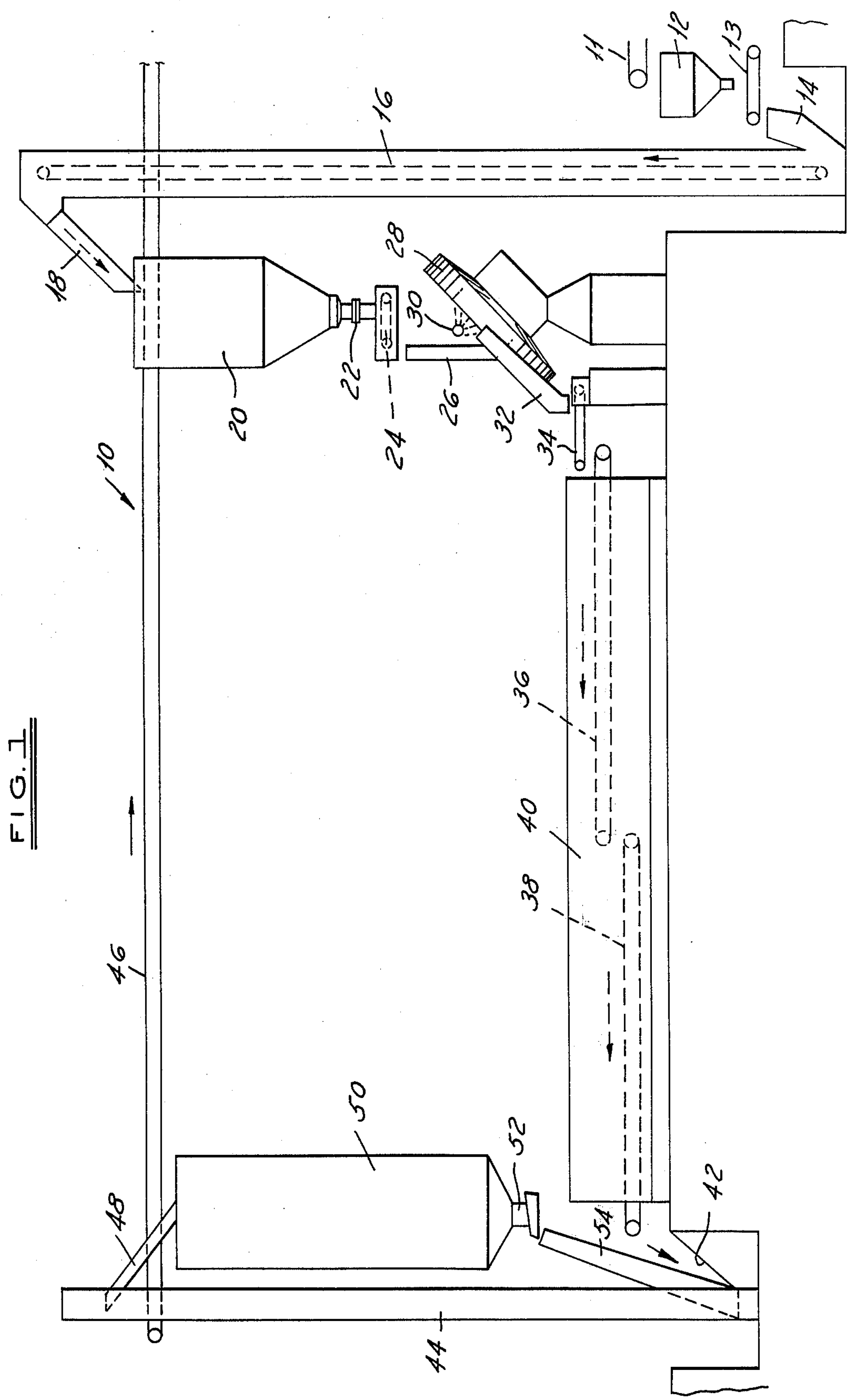
FIG. 1 is a schematic diagram of an apparatus which can carry out the process of this invention.

The method of this invention will be described for manufacturing glass batch materials for supplying a glass melting chamber which is used to melt glass for a float glass chamber. The invention is, however, applicable to the manufacture of glass batch materials in pelletized form for use in the manufacture of any glass composition so long as the glass composition is one which contains percentages of alkali oxide, calcium oxide, and magnesium oxide sufficient to allow adequate quantities of caustic soda, limestone, and dolomite to be used therein to achieve the development of a required bond strength in pelletizing and drying.

The solution concentration and amount of caustic soda which may be used in the process disclosed herein is a variable. Any solution concentration may be used. The two most common are 50% & 73%. The amount of caustic soda solution used is best linked to the total weight of dry material feed, rather than to the weight of a specific material in the feed. The minimum amount of caustic soda solution which will pelletize glass batch materials is about 1 lb. of 73% caustic solution per 24 lbs. of dry ingredients. If a 50% caustic soda solution is used, the lower limit of caustic soda addition becomes about 1 lb. of caustic solution to 16 lbs. of dry ingredients. The upper limits for each of the two different solutions is about 1 lb. of caustic solution to 4 lbs. of dry ingredients. Beyond this upper limit, too much liquid is generally supplied to the pelletizing disc and the size of the pelletized product is not controllable.

The main component essential to the production of strong pellets is the finely divided dolomite. The dolomite should be present in the glass-making materials in a minimum amount. In order for proper bond formation to occur to produce pellets having adequate strength and abrasion characteristics, the dolomite preferably should make up at least about 10% by weight of the total dry feed. The upper limit on the dolomite, as well as the upper and lower limits on the remaining raw materials of the batch, are not explicitly limited by pelletizing. The limits of these materials are set by the desired final glass composition. The glass composition can range through the compositions acceptable for manufacturing both flat glass and container glass provided the above minimum dolomite restriction is generally adhered to.

Salt cake (sodium sulfate) is used primarily as an aid for melting the glass batch. Sulfate useage in the past has generally been in the range of from 5 to 20% by weight of the dry materials for flat glass manufacture. The higher sulfate content is generally used for manufacturing tinted glass. Sodium sulfate may, however, be objectionable because its use results in the emission of gaseous and solid sulfur compounds when the batch materials are melted. It has been found that by using pellets as the batch material for a glass melting furnace, the sodium sulfate content of the pellets may be reduced to 0.25%. These pellets still melt within a reasonable period of time to form homogeneous glass free of unmelted batch even though the sulfate level has been reduced. We have also found that up to 5% of the soda of the final glass composition can be achieved from sodium sulfate without detrimental effect on overall pellet melting characteristics and emission levels.

Table 1 shows the compositions of clear and tinted glasses manufactured by the Glass Division of Ford Motor Company.

Table 1

| Oxide | Clear | Tint |
|---|---|---|
| $SiO_2$ | 72.99 | 72.74 |
| $Al_2O_3$ | .13 | .13 |
| $Fe_2O_3$ | .09 | .52 |
| CaO | 8.80 | 8.78 |
| MgO | 3.91 | 3.90 |
| $Na_2O$ | 13.75 | 13.70 |
| $K_2O$ | .02 | .02 |
| $TiO_2$ | .01 | .01 |
| $SO_3$ | .30 | .20 |

Table 2

| U. S. Screen Size | Sand (Cum.Wgt. % On) | Soda Ash (Cum.Wgt. % On) | Salt Cake (Cum.Wgt. % On) | Dolomite (Cum.Wgt. % On) | Limestone (Cum.Wgt. % On) |
|---|---|---|---|---|---|
| 30 | — to .5 | 1 to 1 | .1 | — | — |
| 40 | — to 5.5 | 6.5 to 12 | .5 | — | — |
| 50 | .5 to 25 | 27 to 36 | 5 | — | — |
| 70 | 7 to 60 | 60 to 66 | 30 | — | — |
| 100 | 47 to 90 | 80 to 81 | 57 | — | 3.0 |
| 140 | 85 to 98 | 94 to 95 | 90 | — | |
| 200 | 98 to 99.7 | 98 to 99 | 98 | — | 18.4 |
| 325 | | | | — | 33.8 |
| Pan | 100 to 100 | 100 to 100 | 100 | 100 | 100 |

The materials employed to make the compositions of Table 1 are set forth in Table 2. Table 2 discloses the general size range of the various materials employed in the manufacture of such glass composition.

Sand, soda ash and salt cake are all commercially available glass making materials. These materials are the standard materials generally available throughout the United States for manufacturing glass. The dolomite and limestone normally used in glass manufacture is generally larger in average particle size than the materials specified for use in the process described herein. The particular dolomite and limestone used in our process are available, however, in commercial quantities at reasonable prices. The limestone and dolomite may be purchased from commercial raw materials suppliers to the glass industry.

The caustic soda used in the method of this invention may be any concentration of a liquid caustic solution. However, the most readily available concentrations are a 50% caustic solution and a 73% caustic solution. As described above, either one of these two solutions may be used and may be used preferably within the limits described.

Discussion of the Process

Reference is made to FIG. 1 which shows a schematic form of apparatus which may be used in practicing the method of this invention. The apparatus employed in the described embodiment of the invention is generally identified by the numeral 10. The raw materials making up the glass batch composition as described in the previous section of this specification are stored in large storage bins (not shown). The raw materials are metered from their storage bins in a prescribed amount, for example, in amounts to make the final glass composition described, onto a feed belt 11 which by the end of its length contains all the materials in a side-by-side or overlying manner. The feed belt 11 delivers the raw materials to a material mixer 12. The mixer 12 mixes the materials and then delivers them to a feed belt 13. The belt 13 delivers the materials to a hopper 14. A bucket conveyer 16 lifts the mixed raw materials to a discharge chute 18 for delivery to a raw material storage hopper 20.

The raw material storage hopper 20 includes a metering device 22 which deliver prescribed quantities of the mixed raw materials to a feed belt 24. The feed belt 24, in turn, delivers the materials to a rotating pelletizing disc 28. At the pelletizing disc, a solution of caustic soda delivered to a spray nozzle 30, through a suitable piping system (not shown), is sprayed on the raw materials in order to cause them to pelletize. The manner of pelletization will be described in greater detail below. The caustic solution has a temperature generally in the range from 100°F to 180°F. Also added to the disc is a small amount of water. Pellet size is controlled by the total amount of liquid added to the pelletizer, all other variables being held constant. Since the sodium hydroxide contributes a glass component ($Na_2O$) and cannot be varied, a small amount of water must be added to the disc.

The continuous delivery of the caustic soda solution to the disc along with the continuous delivery of the dry ingredients produces a continuous stream of formed pellets of a prescribed size. The pellet size is controlled by controlling the variables of the pelletizing disc as is known in the pelletizing art. The continuously developed pellets are discharged from the pelletizing disc 28 through a discharge chute 32. The discharge chute, in turn, delivers the green pellets to a feed belt 34 which delivers the pellets through a spreader device (not shown) to the first of a pair of dryer belts 36 and 38 contained in a multi-stage drying furnace 40. When a 16.5 foot diameter pelletizing disc is used, typically 2.25 tons per hour of caustic solution and 0.75 tons per hour of water may be sprayed on 15.1 tons per hour of raw materials to produce 18.1 tons per hour of green pellets.

In order to make the process a commercially feasible one, the time of drying and the amount of energy employed in the drying of the pellets has to be reduced to an absolute minimum. We have found that by using dolomite and limestone of the specified average particle size, the drying of the pellets can be accomplished on a conventional conveyor-type dryer in less than one hour to produce pellets having the strength required for subsequent handling operations. While the drying of pellets may take more or less time in other types of dryers, the drying time in all cases will be commercially reasonable if the dolomite and limestone of prescribed size is used.

The pellets conveyed by the feed belt 34 to the first dryer belt 36 and subsequently to the second dryer belt 38 are dried on the dryer belts as they move through the multi-stage drying furnace 40. On the dryer belt 36, typically a 3 inch layer of pellets is subjected to a 250°F updraft airflow at a rate of 250 cubic ft. per minute for 5 minutes and a 275°F downdraft airflow of about 250 cubic ft. per minute for 6 minutes. The semi-dry pellets are then distributed onto the dryer belt 38 to form a 9 inch thick layer. On this second belt, pellets are subjected to a 350°F updraft of about 250 cubic ft. per minute for 12 minutes and a 370°F downdraft of about 250 cubic ft. per minute for a period of 18 minutes to dry these pellets. Because of the particular sizes selected for the dolomite and the limestone, as previously stated, the drying action can take place in the relatively short period of time thereby requiring a reasonably sized dryer facility. The product also has a strength sufficient for subsequent handling.

After the pellets are dried in the multi-stage dryer furnace 40, they are discharged from the end of the dryer belt 28 onto a slide 42 which delivers them to a bucket conveyor 44. The bucket conveyor 44 lifts the pellets to its top for placement in one of two areas. For a first placement, the pellets can be delivered to a charging conveyor belt 46 which leads to the glass melting tank associated with either a float glass furnace or any other glass using structure. In this case, the handling of the pellets is directed from the slide 42 to an end use in a melting furnace. As an alternate, the bucket conveyor 44 can deliver the pellets to a discharge chute 48 which, in turn, delivers the pellets to a storage bin 50 for temporary storage. When pellets are demanded at a rate greater than the pellet production rate from the multi-stage dryer furnace 40, the storage bin delivers the pellets through a metering device 52 and a chute 54 to the bucket conveyor 44 to lift the previously stored pellets to a location where they are dischargeable onto the charging conveyor belt 46.

Description of Pelletizing Process

Figure 2:
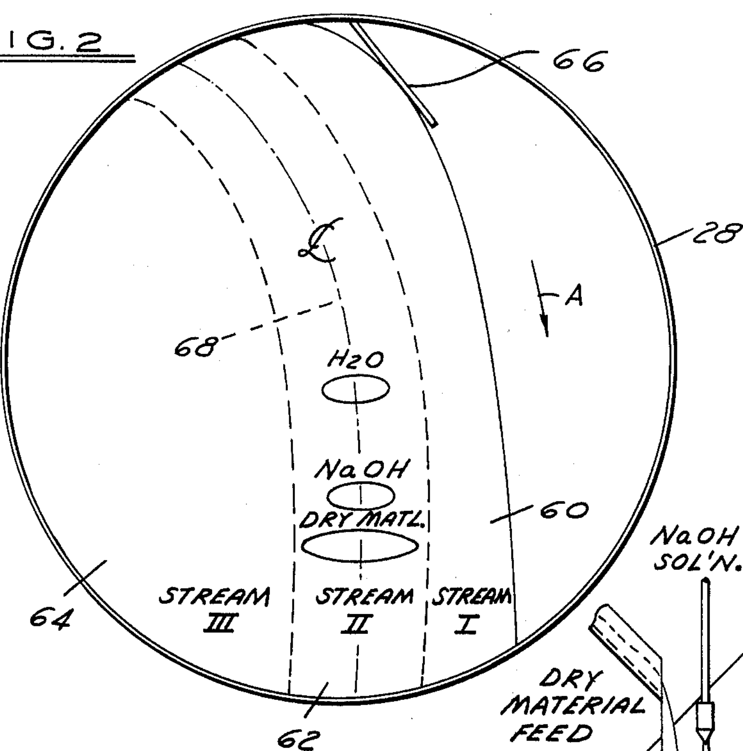
FIG. 2 is a schematic drawing of a rotating, pelletizing disc in which a pellet growth zone and a pellet nucleation zone are separate.
Figure 4:
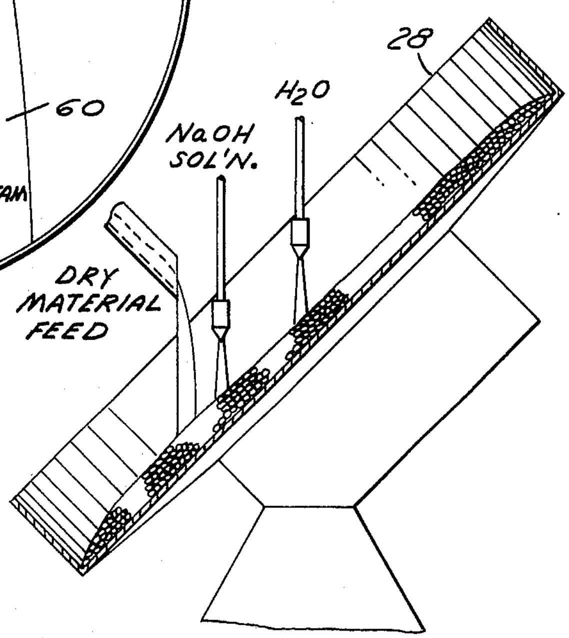
FIG. 4 is a schematic drawing, in cross-section, showing the addition streams on a pelletizing disc used to carry out the process of this invention.
Figure 3:
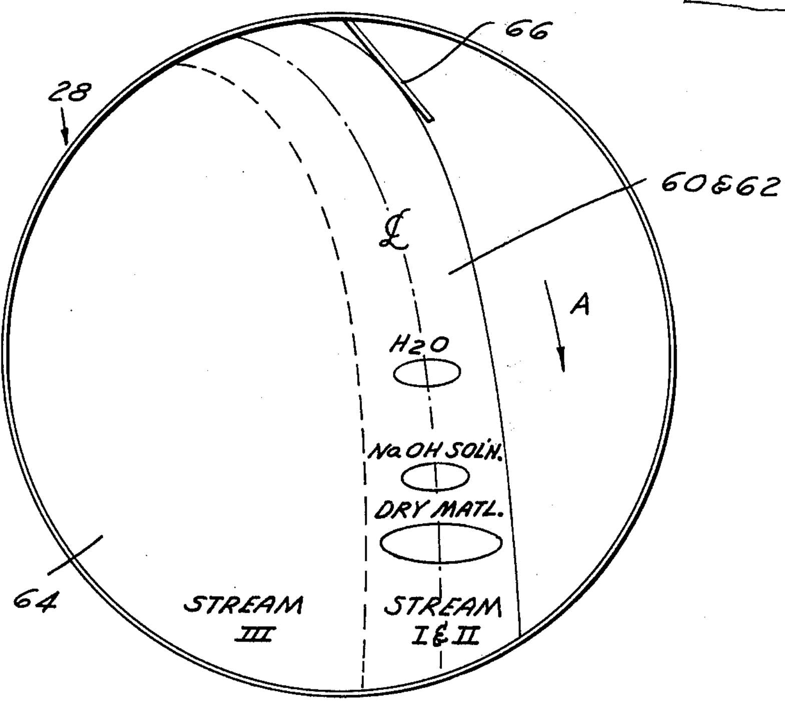
FIG. 3 is a schematic diagram of a pelletizing disc in which a pellet growth zone and a pellet nucleation zone are combined.

The pelletizing disc 28 and the manner in which it is used in the process of this invention will be best understood by reference in FIGS. 2, 3 and 4.

In FIG. 2, the pelletizing disc 28 is shown in a schematic representation. The direction of rotation of the disc is in the direction of arrow A shown on the figure.

In FIG. 2 a pelletizing regime having three zones of pelletization is shown. A first zone is a pellet nucleation zone 60 and it is identified with the nomenclature Stream I. In Stream I small neculi pellets are formed when small pieces of raw materials are bonded together by action of the liquid. A central zone is a pellet growth zone 62, this zone being identified as Stream II. In Stream II the nuclei pellets are alternately wetted by liquid and coated by dry material to grow into larger pellets. A third zone is a pellet tumbling zone 64 which is identified as Stream III. In Stream III fully grown pellets are tumbled to cause them to densify and strengthen.

The pellet nucleation zone 60 and the pellet growth zone 62 extend generally from the top edge of the rotating disc to the bottom edge thereof with each zone having a discernable width. The pellet tumbling zone 64 extends in an area where the pellets are carried upwardly and would, therefore, extend from the bottom portion of the pelletizing disc up towards the top portion to the location where the pellet nucleation and the pellet growth zones commence. A scraper 66 is provided to aid in compacting and directing of the pellets.

In FIG. 3, the pellet growth and nucleation zones 60 and 62 are combined into a single zone in which pellets are both nucleated and grown.

In accordance with the teachings of this invention, the addition point of the caustic soda solution stream and the dry material feed stream is critical to the continuous production of pellets of generally uniform size and shape over a prolonged period of time. Both feed streams should be nearly as wide as the zone on which they fall and should be centered over the zone along a general centerline of the zone, for example, the centerline 68 shown for the pellet growth zone 62 in FIG. 2. Pellet growth will continue slightly to the left of the feed streams as wet pellets continue to pick up loose dry feed materials tumbling in the pellet bed. It is also necessary to keep the feed streams away from the right most edge of the pellet regime. At this edge, the feed materials tend to stick to the pelletizing disc bottom and sides rather than to form larger pellets by sticking to the nuclei and undersize pellets. If the materials stick on a disc surface, it is scraped off by the scraper 66 to form irregular shaped, generally off-chemistry, agglomerates often referred to as "mud lamps". In addition, the caustic soda solution sprayed directly onto the pan bottom loosen a normal thickness built-up layer of materials causing the loosened material to break away from the disc bottom. This break away results in the loss of a smooth bottom surface and the flow patterns on the disc necessary for stable operations are upset and the chemical stability and disc control can be lost. It is important, then, to keep raw material feed stream and, especially, the caustic soda feed stream away from the right edge of the pellet bed and generally centered in the pellet growth zone.

It is important to correlate the width of the caustic solution stream to the width of the raw batch material feed stream. The pelletizing operation can tolerate a caustic solution spray stream narrower than the raw materials feed stream but it cannot tolerate the inverse. The caustic spray should be centered generally along the centerline of the pellet growth zone 62 and it should be centered with respect to the dry material feed stream. The caustic solution spray stream should have a width from slightly less than the width of the raw material feed stream to a width about 30% less than the width of the material feed stream.

If the pellets in the pellet growth zone 62 to the left of the batch feed stream are wetted by having a caustic solution stream wider than the batch feed stream, such pellets will continue to grow by picking up any small particles on the disc or particles loosely bonded to other pellets. This type of pellet growth is difficult to control and the result is a non-uniform pellet chemistry and a pelletizing disc that is susceptible to instability. Such disc operation produces various sized pellets over a period of time.

If the pellets to the right of the batch feed are wetted, the nuclei or seed pellets in Stream I will tend to conglomerate together. This will upset the critical sequence of pellet formation and growth which occurs in normal disc operation. This condition will quickly result in the loss of stability on the pelletizing disc and the production of random size pellets.

Also of concern to use is the prevention of raw materials feeding onto pellets or nuclei not wetted by the caustic spray stream. The feeding of excessive amounts of dry materials into the right portion of the feed stream will result in the over production of nuclei or seed pellets and the occurence of un-nucleated raw materials in the disc. The size of the output pellets will quickly begin to decrease and eventually will reach a very small size, thereby introducing drying and melting difficulties.

Feeding dry batch materials into the left portion of the pellet growth zone 62 without the application of sufficient caustic solution will result in some chemical stratification as the finer material will adhere to the finished pellets, while the coarser materials will sift through the pellet bed on the disc. Also the fine materials will only be loosely bonded to the finished pellets. These loosely bonded materials are quickly abraided from the pellets resulting in dusting problems when the pellets are handled after drying.

The exact location for the water stream, caustic soda solution stream and the batch feed material stream are not as critical as previously discussed points on alignment. Two points must be considered when locating the batch feed material stream. First, the batch material feed stream should be near the widest part of the zone of the pelletizing disc into which the dry feed materials are to be discharged. Secondly, the batch feed materials should be upstream of the pan edge enough to allow some pellet rolling to compact and dry the pellets before they roll against the pan edge.

The location of the caustic soda solution stream along the pellet growth zone is not very critical. It is preferred that the caustic stream be located upstream of the batch feed material stream. The amount of variation and distance between the caustic spray and the dry material feed spray is fairly flexible. The water spray location is not as critical as the other feeds. The water spray is necessary to allow some control over pellet size. This water spray should be located in the pellet forming zone and should be as wide as the caustic spray. A wide spray is preferred for uniform dispersion purposes. The preferred placement along the stream is upstream of the batch feeds but it is not critical as downstream placements can also be used.

In the preferred embodiment, the mixing of the raw materials is accomplished by use of a mixer 12. Other devices which develop a mixing action may be employed to mix the materials. Also, it is possible to continuously weight materials being delivered from the storage bins to that predetermined amounts of materials are placed on the feed belt. If a continuous weighing system is employed, the materials placed on the belt will be in a side by side or overlying condition and will be in a proper proportion to be fed directly to the pelletizing disc. Thus, as used in the claims, the word "mixing" covers not only the mixing in a mixer, a rotating drum or other device, but is also covers continuously weighing the materials as they are delivered from their storage bins with placement of such materials on a feed belt in a side by side or overlying relationship.

There has been disclosed herein a process for making pellets on a pelletizing disc. In view of the teachings of this specification, many modifications on this invention will be apparent to those skilled in the art. It is intended that all modifications which fall within the true spirit and scope of this invention be included within the scope of the appended claims.

We claim:

1. A method of pelletizing glass batch materials including commercially available sand, soda ash (sodium carbonate), salt cake (sodium sulfate), other minor glass forming materials, dolomite having an average (statistical mean) particle size less than 15 microns, and limestone having an average (statistical mean) particle size less than 250 microns which comprises the steps of:

mixing the glass batch materials together;

establishing on a rotating pelletizing disc a pelletizing regime in which three zones of pelletization exist in the form of a pellet nucleation zone, a pellet growth zone, and a pellet tumbling zone; each of the zones existing generally from the top of the pelletizing disc downwardly over an area of the pelletizing disc with each zone having a decernable width;

adding a prescribed amount of water to a portion of the pellet growth zone;

adding a prescribed amount of a caustic soda solution to a portion of the pellet growth zone spaced downwardly from the top of the zone, the caustic addition being in the form of a wide stream generally centered with respect to the centerline of the pellet growth zone and spread across a substantial portion of the width of the pellet growth zone; and adding a prescribed amount of the mixed glass batch materials to a portion of the pellet growth zone spaced downwardly from the caustic addition position, the mixed batch materials addition being in the form of a wide stream generally centered with respect to the centerline of the pellet growth zone and spread across a substantial portion of the width of the pellet growth zone, the caustic addition stream being in the range from slightly less than the width of the glass batch materials addition stream with both addition streams being centered with respect to each other.

2. The method of claim 1 wherein: the pellet growth zone and the pellet nucleation zone are separate.

3. The method of claim 1 wherein: the pellet growth zone and the pellet nucleation zone are combined.

4. The method of claim 1 wherein: the glass batch materials addition stream is located generally over the widest portion of the pellet growth zone.

5. The method of claim 1 wherein: the water added to the pellet growth zone is added in a stream above the caustic addition stream and generally centered with respect to the centerline of the pellet growth zone, the water addition stream having a width generally equal to the width of the caustic addition stream.

* * * * *